(12) United States Patent
Grönroos

(10) Patent No.: US 7,088,692 B1
(45) Date of Patent: Aug. 8, 2006

(54) APPARATUS, AND ASSOCIATED METHOD, FOR REWARDING PERFORMANCE OF A COMPUTER GAME AT A MOBILE TERMINAL

(75) Inventor: Mika Grönroos, Littoinen (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/376,927

(22) Filed: Aug. 18, 1999

(51) Int. Cl.
*H04Q 7/00* (2006.01)

(52) U.S. Cl. ............... 370/328; 455/462; 455/414; 455/575; 370/342; 340/323 R

(58) Field of Classification Search ............... 455/575, 455/90, 566, 414, 415, 435, 466, 462; 370/432, 370/328; 340/825.47, 311.1, 323 R; 700/91, 700/92
See application file for complete search history.

(56) References Cited

U.S. PATENT DOCUMENTS

| 4,097,855 | A | * | 6/1978 | Salvo ................... 340/323 |
| 5,120,076 | A | | 6/1992 | Luxenberg et al. |
| 5,887,266 | A | | 3/1999 | Heinonen et al. ............ 455/558 |
| 5,949,679 | A | * | 9/1999 | Born et al. ............ 340/323 R |
| 6,091,956 | A | * | 7/2000 | Hollenberg ................. 455/456 |
| 6,272,332 | B1 | * | 8/2001 | Matsumoto et al. ........ 455/412 |
| 6,275,695 | B1 | * | 8/2001 | Obhan ........................ 455/423 |
| 6,650,892 | B1 | * | 11/2003 | Thiriet ...................... 455/419 |

FOREIGN PATENT DOCUMENTS

| DE | 196 10 840 A1 | 9/1997 |
| WO | PCT/F 195/00591 | 5/1996 |
| WO | PCT/F 198/00250 | 10/1998 |
| WO | PCT/F 198/00679 | 3/1999 |

\* cited by examiner

Primary Examiner—Edward F. Urban
Assistant Examiner—Tilahun Gesesse
(74) Attorney, Agent, or Firm—Alston & Bird LLP

(57) ABSTRACT

Apparatus, and an associated method, rewards a user for playing computer games at a mobile terminal. Computer games, or other recreational applications, formed of executable code at a mobile terminal are executed by a user. When success indicia associated with playing the computer game, such as a game score, exceeds a selected threshold, a message is formed and sent to an award server. The award server is operable to authorize a reward for the user of the mobile terminal.

19 Claims, 8 Drawing Sheets

APPARATUS, AND ASSOCIATED METHOD, FOR REWARDING PERFORMANCE OF A COMPUTER GAME AT A MOBILE TERMINAL

The present invention relates generally to a radio communication system having a mobile terminal operable, in addition to performing conventional radio communications, for the recreational benefit of a user. More particularly, the present invention relates to apparatus, and an associated method, by which to reward a user who uses the mobile terminal for recreational benefit.

BACKGROUND OF THE INVENTION

Advancements in communication technology have permitted the development, installation, and widespread usage of wireless communication systems through which to communicate telephonically. In a wireless communication system, a radio-link forms at least a portion of a communication path upon which communication signals are transmitted. Increased mobility of communication is, as a result, permitted through the utilization of a wireless communication system.

The network infrastructure of various types of cellular communication systems, for instance, have been installed throughout significant geographical areas. Large numbers of subscribers to such cellular communication systems are able to communicate telephonically when positioned in areas encompassed by the network infrastructure of the system pursuant to which subscription is made. Telephonic communication of both voice and data is generally permitted in such cellular communication systems.

A subscriber to a cellular communication system typically utilizes a mobile terminal which is formed of a radio transceiver capable of both transmitting and receiving radio signals communicated upon radio-links with the network infrastructure of a cellular communication system. The term "user" shall be used herein to identify one utilizing the mobile terminal. Some cellular communication systems utilize digital communication techniques in which information is digitized prior to its communication and subsequent to its reception. Processing circuitry is utilized to act upon information, prior to its transmission, and subsequent to its reception.

The circuitry forming a mobile terminal is oftentimes packaged in a housing which permits convenient carriage of the mobile terminal by a user. Various constructions of mobile terminals are of physical dimensions permitting a user thereof to carry the mobile terminal in a shirt pocket, or the like, of the user.

Because the mobile terminal utilizes processing circuitry, the processing circuitry can also be utilized to perform functions in addition to functions required to effectuate conventional communication operations. That is to say, functionality of other devices can be incorporated into the mobile terminal. For instance, information processing and retrieval functions are sometimes incorporated into a mobile terminal. And, recreational functions, here referred to as recreational applications, are also sometimes incorporated into a mobile terminal. Applications referred to as computer games are exemplary of recreation.

Incorporation of recreational application into a mobile terminal provides marketing advantages to a mobile terminal manufacturer, a system operator, and also a recreational application developer. A mobile terminal manufacturer and recreational application developer are able to increase their prospective customer base, and a system operator is able to increase awareness of, and use of, system resources.

To date, however, the marketing advantages provided by the incorporation of recreational applications into the functionality of the mobile terminal generally primarily pertains to the general increase in the end-product market size of the mobile terminal, as well as the presumed carryover effect of increased usage of the mobile terminal for communication operations if the mobile terminal is also utilized by a user to execute, i.e., play, recreational applications. Advantage, however, is generally not made of the synergies available to a mobile terminal incorporating both the functionality of a recreational application and the functionality of a wireless transceiver. If a manner could be provided by which to take advantage of the synergies available to a mobile terminal incorporating the functionality of a recreational application, or other executable code, executable for recreational purposes, increased marketing opportunities would be provided.

It is in light of this background information related to mobile terminals operable in a radio communication system that the significant improvements of the present invention have evolved.

SUMMARY OF THE INVENTION

The present invention, accordingly, advantageously provides apparatus, and an associated method, by which to reward a user who executes a recreational application which is incorporated into the functionality of a mobile terminal.

Executable code forming a recreational application is caused to be executed by the user of the mobile terminal, thereby to play the recreational application. User interaction, for instance, during the execution of the code is, at least in part, determinative of a game score, or other performance related static associated with playing of the application. Upon user authorization, a message containing an indication of the game score, or some other indicia of successful performance of the application, is generated and forwarded to a remote location. When received at the remote location, an award is selectably authorized for the benefit of the user. Marketing advantage is possible both through the information that can be generated through the reporting and award process. Also, awarding a user for playing of a recreational application at the mobile terminal increases user acceptance of use of the mobile terminal.

In one aspect of the present invention, a mobile terminal is provided which includes one or more blocks of executable code forming one or more recreational applications. Upon user initiation, the block of code is executed, typically along with user interaction during its execution. A game score is associated with the playing of the application, and the game score provides an indication of the level of successful performance of the application by the user.

In one implementation, if the game score is beyond a selected threshold, the user of the recreational application is eligible for a reward. A message containing the indication of the game score is generated and transmitted over the radio-link, thereafter to be routed to an award server. In one implementation, the message containing an indication of the game score is formatted to form an SMS (short message service) message. A GSM (global system for mobile communications) cellular communication system defines the format of, and provides for the generation of, SMS messages. In another implementation, the GSM system provides GPRS (general packet radio service), and messages transmitted between the mobile terminal and the award server are generated pursuant to GPRS messaging. In another implementation, the message is formed as a USSD (undefined subscriber service data) message.

In another aspect of the present invention, an award server is operable to receive a message containing an indication of the recreational application played by a user of the mobile terminal. The award server, for instance, is coupled by way of a packet data network backbone, such as an internet backbone, to network infrastructure of a cellular communication system in which the mobile terminal is operable. The award server includes a data base in which, for example, the identity of the mobile terminal, and hence the user thereof, is indexed together with information pertaining to the user of the mobile terminal, such as prior game scores, cumulative game scores, etc. Responsive to the message indicating the game score to be at least the threshold level, a reward is authorized for the user of the mobile terminal. The threshold level is selected as desired and is, e.g., a "best-ever" level, a selected one of a series of achievement levels, etc. In one implementation, the reward is executable code which is returned to the mobile terminal by way of the communication network backbone and, then, the radio-link of the cellular communication system.

In another implementation, the reward is provided to the user by way of another communication route, such as by way of conventional mail service. Exemplary rewards include downloadable audio, such as ringing tones to be used to alert the user of subsequent call terminations, downloadable screen displays, and downloadable computer games. The reward, in another implementation, is monetary, payable to a user's credit card account, or to a balance account maintained elsewhere. Such payment enables future gaming use of the terminal or future withdrawal of the balance. And in another implementation, the payments are made to credit the user's account with the network operator or, e.g., to award free talk-time or SMS messaging.

Additional information pertaining to the user of the mobile terminal is obtainable, for instance, by requiring the user to submit such information together with the message indicating the game score. The additional information can alternately be supplied at other times, such as during initial registration. The information can be used, for instance, for purposes of marketing research and research and development purposes. Also, by incorporating the functionality of the recreational application into the functionality of a conventional mobile phone and by providing an award system for use of the applications, an additional market segment becomes available for marketing of the mobile terminal. A better-diversified market is available to the mobile terminal manufacturer. Also, a generator of recreational applications is also able to have a new platform upon which to develop recreational application products.

In these and other aspects, therefore, apparatus, and an associated method, is provided for a mobile terminal operable by a user in a radio communication system to communicate with a communication station by way of a communication path which includes a radio part. At least one executable block of code is executable by the user at the mobile terminal. Execution of the executable block of code generates at least an indicia of performance success of the execution by the user of the executable block of code. A detector is coupled to receive indications of the indicia of performance success generated during execution of the executable block of code. The detector at least detects whether the indicia of performance is beyond a selected threshold and selectively generates a result indication indicative thereof. A formatter is coupled to receive the result indication generated by the detector. The formatter formats the result indication into a signal transmittable upon the communication path.

In these and other aspects, apparatus, and an associated method, is further provided for an award server operable in a communication system to communicate with a mobile terminal by way of a communication path which includes a radio part. A result-indication signal receiver is coupled to receive indications of a result-indication signal communicated to the award server by the mobile terminal. An award data base has result data indexed together with a mobile terminal user identity. The award data base is accessible at least responsive to reception of the result-indication signal received at the result-indication signal receiver. A reward signal generator is selectably operable responsive to data accessed from the award data base. The reward signal generator generates a reward signal for communication to the mobile terminal. The reward signal is representative of a reward responsive at least alternately to one of the result-indication signal and values stored in the award data base.

A more complete appreciation of the present invention and the scope thereof can be obtained from the accompanying drawings which are briefly summarized below, the following detailed description of the presently-preferred embodiments of the invention and the appended claims.

DETAILED DESCRIPTION OF THE PREFERRED EMBODIMENT

Figure 1:
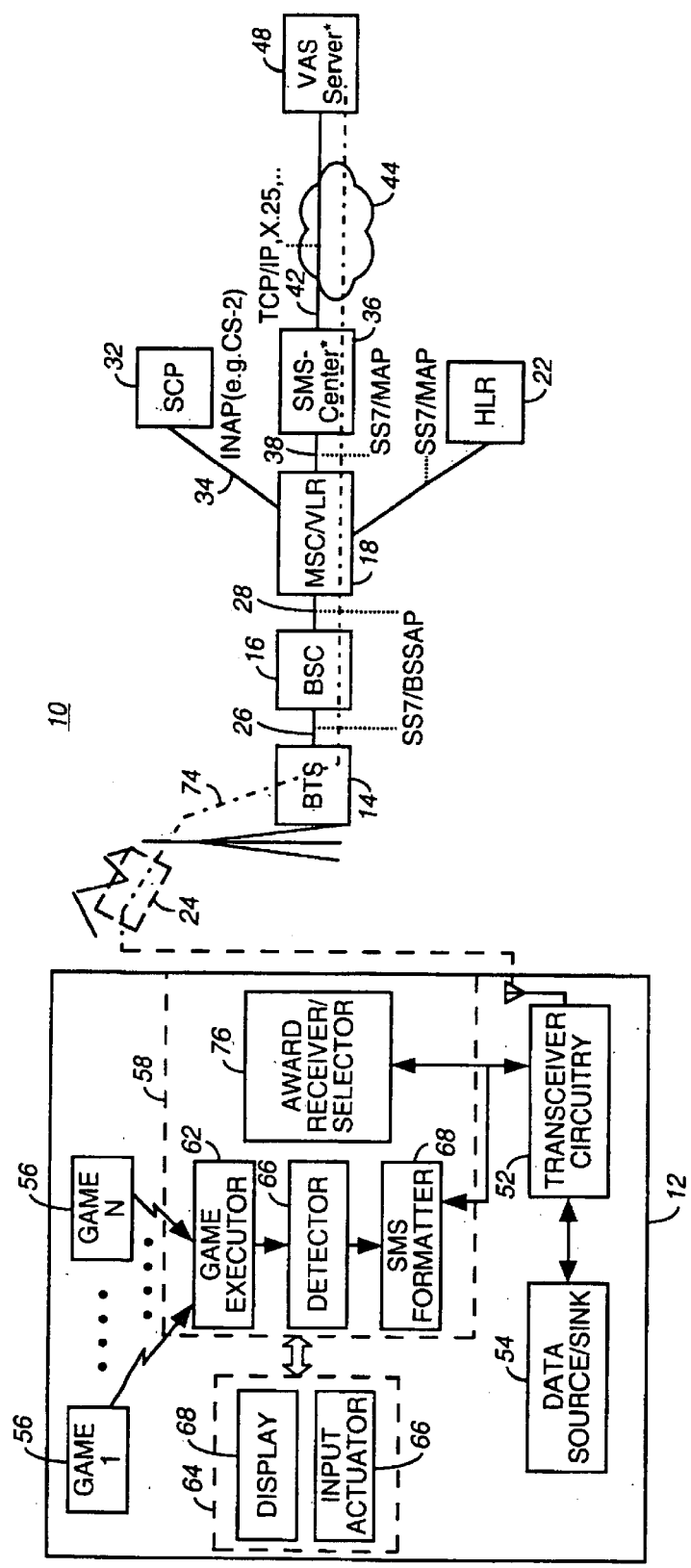
FIG. 1 illustrates a functional block diagram of a communication system in which an embodiment of the present invention is operable.

Referring first to FIG. 1, a radio communication system, shown generally at 10, is operable to provide for radio communications with mobile terminals, of which the mobile terminal 12 is exemplary. In the exemplary implementation, the radio part of the communication system 10 is formed of a cellular communication system. In other implementations, the communication system 10 is formed of other types of radio communication systems. Operation of other embodiments of the present invention are analogously operable in such other communication systems. In the exemplary implementation, the radio communication system comprises a GSM (Global System for Mobile communications) system, various embodiments of the present invention can be implemented in other radio communication systems such as, for example, a CDMA (code division multiple access) system, a DCS 1800 system, a PCN (personal communication network) system, a UMC (universal mobile communication) system, a UMTS (universal mobile telecommunication system), a FPLMTS (future public land mobile telecommunication system), etc. More generally, various embodiments of the present invention are generally useful for any wireless communication network having, or developed to have, server access over a wireless network part, e.g., wireless LAN (local area network) terminals are utilized in an alternate implementation.

The radio part of the communication system includes network infrastructure including a base transceiver station (BTS) 14, a base station controller (BSC) 16, and a mobile switch controller/visiting location register (MSC/DLR) 18. The network infrastructure also includes a home location register (HLR) 22.

The base transceiver station 14 is capable of transmitting and receiving forward link and reverse link, respectively, signals over a radio-link 24.

In the exemplary implementation, the mobile terminal 12 is capable of generating SMS (short message service) signals, such as those generated during operation of a GSM (global system for mobile communications) cellular communication system. The message is transmitted as a reverse link signal upon the radio-link 24 and is detected by the base transceiver station 14. The base transceiver station is coupled to the base station controller 16 by way of a signaling data link, here an SS7/BSSAP (signaling system number 7-signaling data link/base station system application part) 26.

The base station controller 16 forwards the message by way of the line 28, also an SS7/BASSAP data link to the mobile switching center 18. The mobile switching center 18 is here further shown to be coupled to a service control point (SCP) array by way of a line 34, here an INAP (intelligent network access point), e.g., control set number 2. And, the MSC/VLR 18 is further shown to be coupled to an SMS (short message service)-center 36 by way of the line 38. The line 38 is an SS7/MAP (signaling system number 7/mobile application part) line. The SMS-center 36 is here operable to format the information content of the SMS message in TCP/IP (transmission control protocol/internet protocol) form on the line 42 thereafter to be routed through the internet backbone 44 to be delivered to a value added services (VAS) server 48, here an award server. In another implementation, the SMS-center 36 is operable to format the informational content of the SMS message into a different form, such as a X.25-formatted protocol. And, in another implementation, the SMS-center 36 and the server 48 are resident at a common network element. That is to say, the functional operations performed by the elements 36 and 48 are performed at a common device. The use of SMS messages is exemplary. In another implementation, an embodiment of the present invention is operable pursuant to a GSM system that provides for GPRS. GPRS messaging is utilized in such an embodiment.

The mobile terminal 12 is here shown to include conventional transceiver circuitry 52 which is coupled to a data source and sink 54 to permit operation of the mobile terminal in conventional manner to originate and terminate data at the data source/sink 54.

The mobile terminal also includes blocks of executable code forming, when executed, computer games. While the exemplary implementation describes the executable code to be computer games, such terminology is used merely to represent, simply, any recreational application. Here, n blocks of executable code 56 are available at the mobile terminal. The blocks are stored, for instance, in memory elements of the mobile terminal. Selected blocks forming the games 56 are retrievable by a controller 58, here shown to include a game executor 62. The game executor 62 is operable to execute the retrieved blocks of code to perform playing of the game.

The controller 58 is here shown further to be coupled to a user interface 64 which includes both an input actuator 66 and a display element 68. In one implementation, the input actuator includes the telephonic actuation keys of the mobile terminal, and the display element 68 includes the mobile-terminal, LCD (liquid crystal display) device. In the exemplary implementation, a user of the mobile terminal, through actuation of the input actuator 66, causes a selected game 56 to be retrieved and executed by the game executor 62. And, in the exemplary implementation, user actuation of the input actuator 66 during execution of the game 56, and displays are displayed upon the display element 68 during execution of the game.

The controller further includes a detector 66 operable to detect game scores generated responsive to execution of a game by the game executor. The detector 66 detects, for instance, when the game score exceeds a selected threshold, a cumulative threshold of repeated execution of the game, or other success indicia related to execution of the game. If the selected threshold is exceeded, indication of such success indicia is provided to an SMS (short message service) formatter 68. The formatter 68 formats the indication provided thereto by the detector into an SMS message which is provided to the transceiver circuitry 52 to send the message as a reverse link signal on the radio-link 24. The message travels upon a communication path, indicated by the line 74, shown in dash in the Figure. The message is routed through the network infrastructure of the communication system, through the internet backbone 44, and delivered to the award server 48.

The mobile terminal further includes an award receiver/selector 76 coupled to the transceiver circuitry 52. The award receiver/selector is operable to receive awards communicated to the mobile terminal and to selectively make use of such awards. In the exemplary implementation, awards are generated by the award server 48 responsive to an SMS message received thereat. The award is a reward to the user of the mobile terminal for the successful execution of the game. Awards include, for instance, ringing tones to be generated by the mobile terminal, executable code forming other computer games, or the like.

The controller 58, during operation of an embodiment of the present invention, obtains information regarding execution of the game at the mobile terminal and provides information for an SMS message to be sent to the server 48. Any appropriate entity is able to run the server, such as an operator, a service provider, or a mobile terminal producer.

The controller 58 is further operable to analyze incoming messages, such as SMS messages to determine whether an award has been returned to the mobile terminal.

In one implementation, the user of the mobile terminal registers to be a player at the award server by first sending a specifically formatted SMS message to the award server. Alternately, an internet-relayed message, or regular postal service registration procedure is used to register the player at the award server. In one implementation, marketing information is further collected during registration, or thereafter. Categories of desired awards can also be provided to the award server during registration, or thereafter.

The award server is thereby operable during operation of an embodiment of the present invention to register and assign new players and provide certification, such as pursuant to cryptographic procedures. A data base is maintained at the award server of various information related to the mobile terminal, such as the MSISN (mobile subscriber international subscriber number), the IMEI (international mobile identifier), an encryption key, types of awards to be rewarded, and also marketing control and collection information. The award server is operable to acknowledge all award requests with at least a notice-feedback message to the mobile terminal from which the message originated. The award server, in one implementation, is further operable to collect long-term statistics for purposes of-marketing research to grant long-term, extra awards, and to provide marketing feedback to the users of new computer games and mobile terminals.

In one implementation, the mobile terminal includes a game award handler which automatically generates information related to the game that is played, and the user identity into a network transmission functional block, e.g., in an SMS message, the MO to be sent to the award server.

Figure 2:
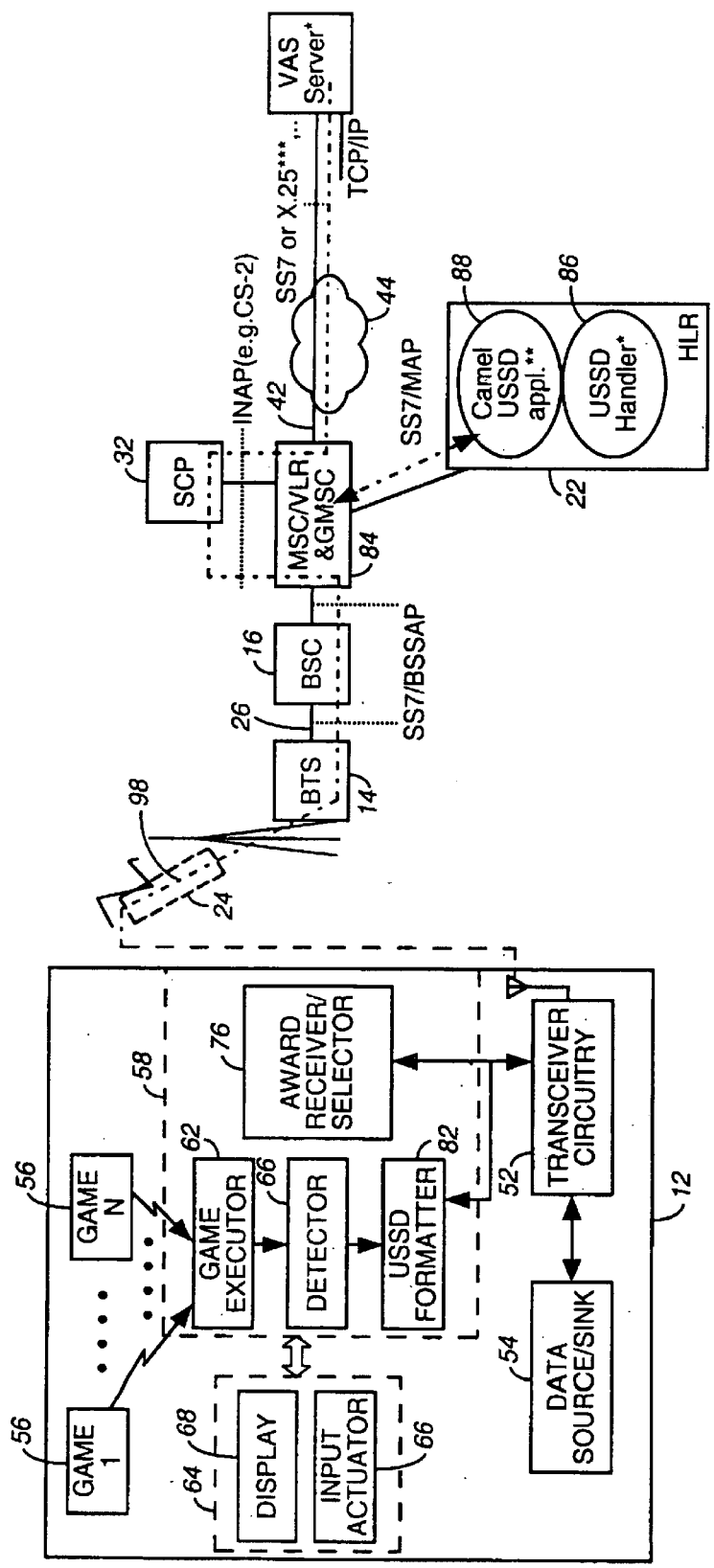
FIG. 2 illustrates a functional block diagram of a communication system, similar to that shown in FIG. 1, but in which another embodiment of the present invention is operable.

FIG. 2 illustrates the communication system 10 of another embodiment of the present invention. The communication system shown in FIG. 2 differs with that shown in FIG. 1 in that in substitution for the SMS formatter 68 of FIG. 1, a USSD (undefined subscriber service data) formatter 82 forms a portion of the mobile terminal. In this embodiment, the network infrastructure of the radio part of the communication system includes an MSC/VLR (mobile switching center/visiting location register) and a GMSC 84. And, the HLR 22 is here shown to include a USSD handler 86 and a camel USSD application. The communication path of a USSD message generated by the mobile terminal is indicated by the line 92, shown in dash such that the message is routed through the service control point 32 and also the HLR 22, thereafter to be forwarded to the server 48.

Figure 3:
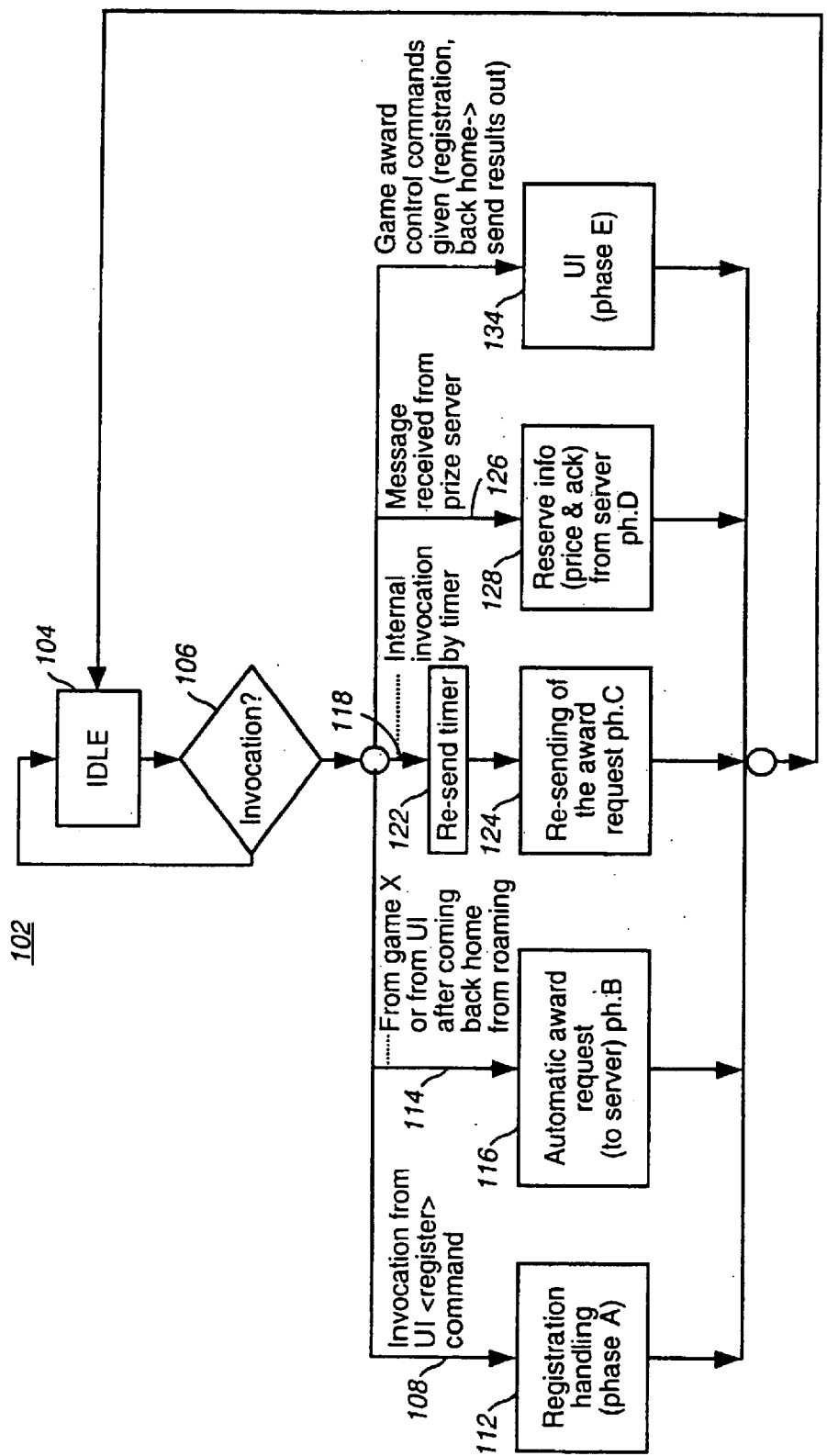
FIG. 3 illustrates a method flow diagram listing the method of operation of the control element forming a portion of the mobile terminal shown in FIGS. 1 and 2 of an exemplary embodiment of the present invention.

FIG. 3 illustrates a method flow diagram, shown generally at 102, representative of the main software design logic of the controller 58. Here, the mobile terminal is maintained in an idle mode 104 until a determination is made, at the decision block 106, that operation is to be invoked. If the invocation is generated by actuation of the user actuator 66 of the user interface, a path, indicated by the line 108 is taken to registration handling procedures, indicated by the block 112. If the controller invocation is implemented by a computer game, or return of a mobile terminal subsequent to roaming operations, the path 114 is taken to the block 116 whereat automatic award request procedures are performed. If invocation of the controller is instituted by timing out of an internal timer, a path, indicated by the line 118 is taken to the block 122 wherein timer re-send procedures are performed, and, thereafter, an award request is re-sent, indicated by the block 124. If invocation is instituted by a message received from an award server, the path 126 is taken to the block 128 or add reserve information procedures are carried out to reserve information from the award server. And, if invocation is instituted by game award control commands, the path 132 is taken to the block 134 whereat user interface operations are carried out. Subsequent to operation of the procedures in any of the blocks 112, 116, 124, 128, and 134, a branch is taken back to the idle mode 104.

Figure 4:
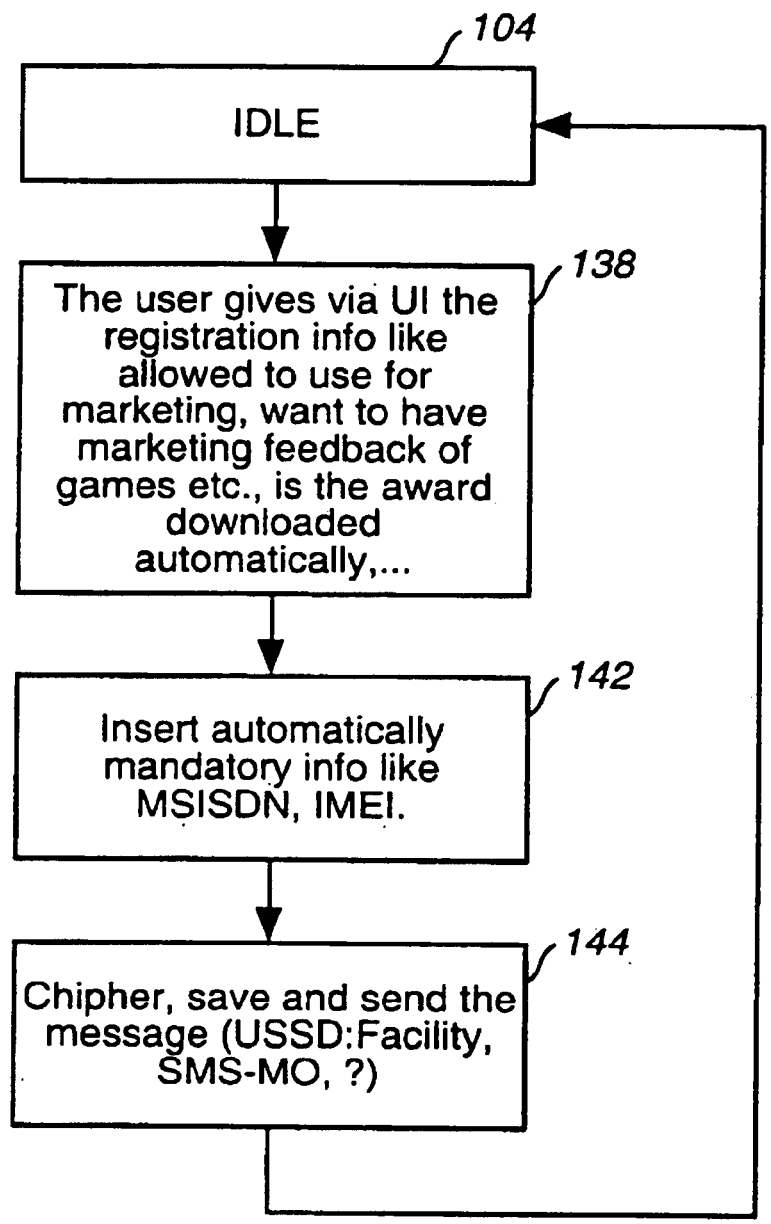
FIG. 4 illustrates a method flow diagram of the registration handling procedures forming a portion of the method shown in FIG. 3.

FIG. 4 illustrates the registration handling procedures 112 in greater detail. The idle mode is again shown. First, and as indicated by the block 138, the user of the mobile terminal provides, through actuation of the user interface 64, registration information which is used, for instance, for marketing purposes, whether awards are to be downloaded automatically, whether marketing feedback related to game execution is selected, etc. Then, and as indicated by the block 142, mandatory information, such as the MSISDN and the IMEI of the mobile terminal are provided. And, as indicated by the block 144, ciphering, if appropriate, is performed. Also, saving and sending of a message to be communicated to the award server is performed.

Figure 5:
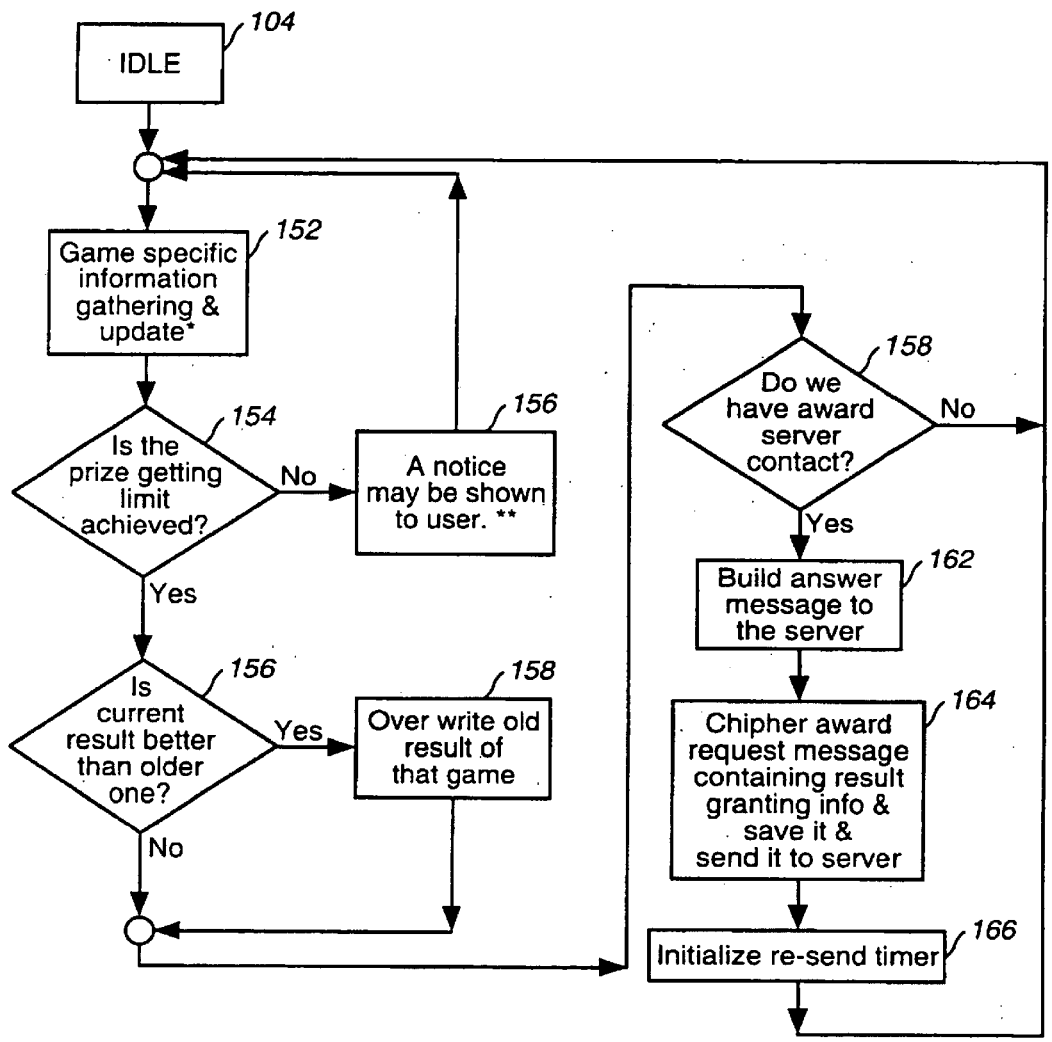
FIG. 5 illustrates a method flow diagram of automatic award request procedures forming a portion of the method shown in FIG. 3.

FIG. 5 illustrates the automatic award request procedures 116. Again, the idle mode 104 is also shown. First, and as indicated by the block 152, game-specific information is gathered and updated. Then, and as indicated by the decision block 154, a determination is made as to whether a selected threshold has been exceeded. If not, the NO branch is taken to the block 156 whereat a notice is displayed upon the display element for reviewing by the user. If, conversely, the selected threshold has been achieved, the YES branch is taken to the decision block 156, and a determination is made as to whether the success indicia associated with the playing of the game exceeds a prior level of success indicia. If so, the YES branch is taken to the block 158 and an old success indicia value is overwritten with the new success indicia value. Thereafter, and if a NO branch is taken from the decision block 156, a determination is made at the decision block 158 as to whether contact is made with the award server. If no, the NO branch is taken back to the block 152. Otherwise, the YES branch is taken and an answer message is built to be communicated to the award server, as indicated at the block 162. Then, and as indicated by the block 164, the award request message, containing result-granting information is saved, ciphered, and sent to the award server. Thereafter, and as indicated by the block 166, a re-send timer is initialized. And, a loop is taken back to the block 152.

Figure 6:
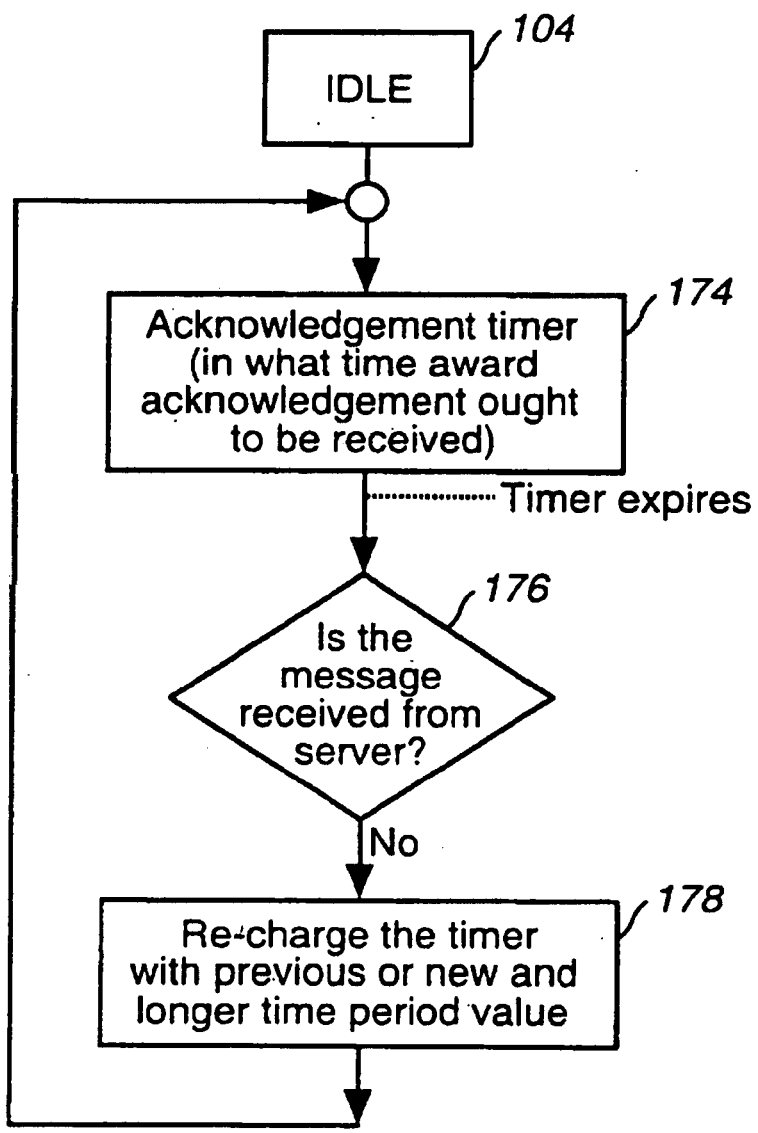
FIG. 6 illustrates a method flow diagram of re-sending award request procedures forming a portion of the method shown in FIG. 3.

FIG. 6 illustrates the re-sending request procedures 124. Again, the idle mode 104 is also shown in the Figure. First, and as indicated by the block 174, an acknowledgment timer is started. The acknowledgment timer is indicative of the time period within which an award acknowledgment ought to be received. When the timer expires, a determination is made, as indicated by the decision block 176, as to whether a message has been returned. If not, the timer is reset with a previous or a new and longer time-period value. Then, a branch is taken back to the block 174.

Figure 7:
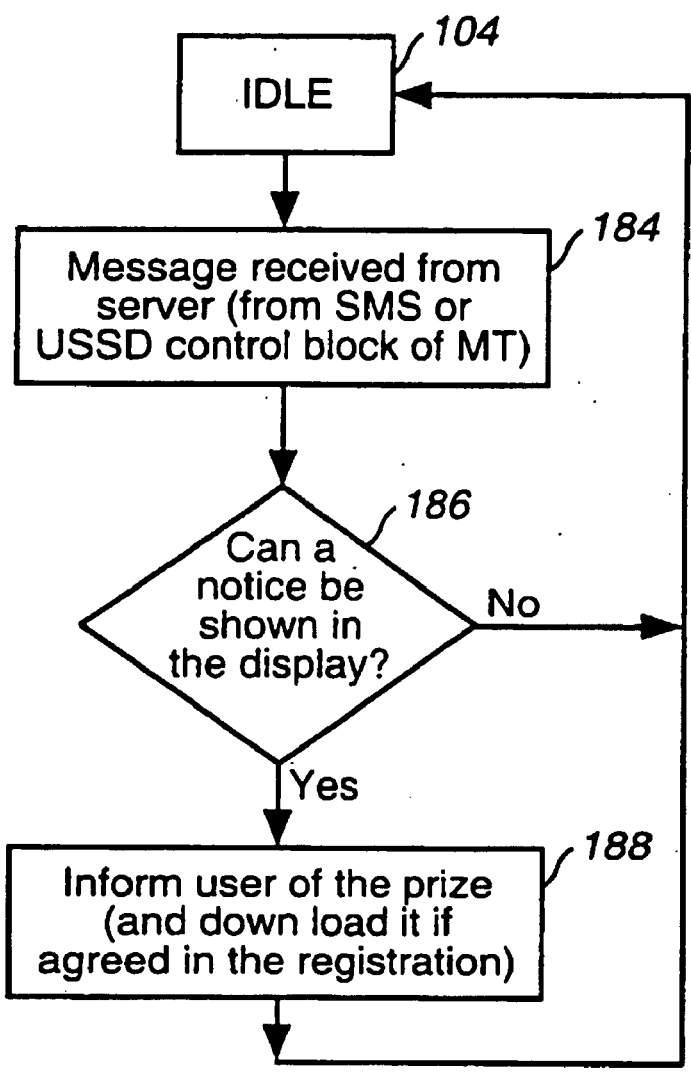
FIG. 7 illustrates a method flow diagram of message reception procedures forming a portion of the method shown in FIG. 3.

FIG. 7 illustrates the reserve information procedures responsive to acknowledgment information returned by the award server. Again, the idle mode 104 is also shown in the Figure. First, and as indicated by the block 184, a message is received from the award server. Then, and as indicated by the decision block 186, a determination is made as to whether a notice can be shown in the display representative of the received message. If so, the YES branch is taken to the block 188 and the user is informed of a way of the display element of the user interface of the award. If permitted, such as pursuant to a previous registration agreement, the award is further automatically downloaded to the mobile terminal.

Figure 8:
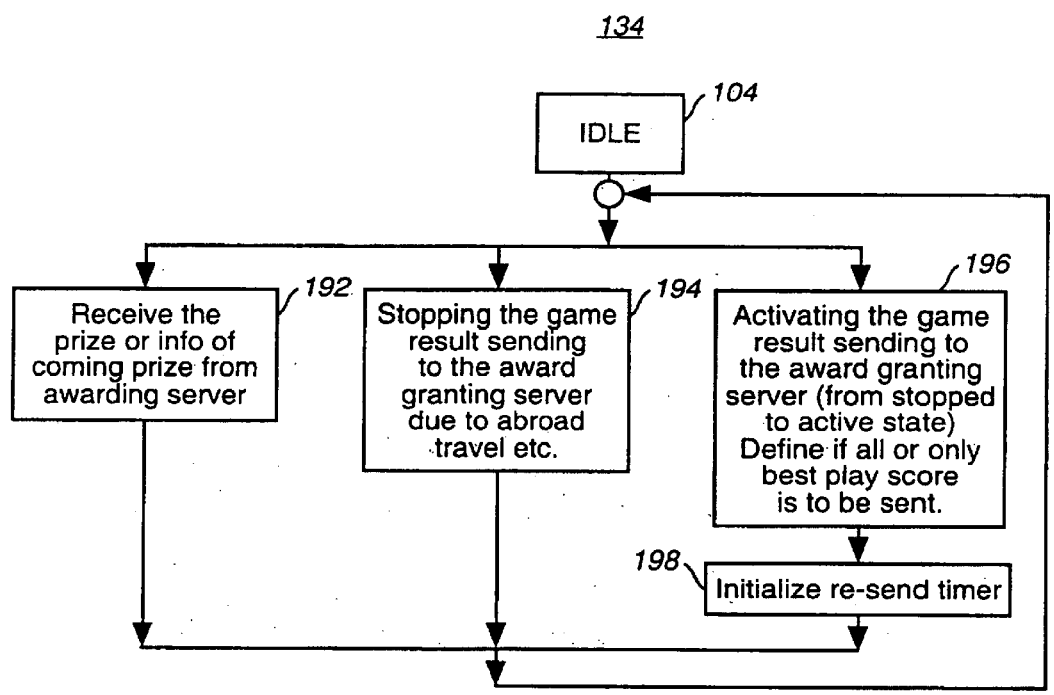
FIG. 8 illustrates a method flow diagram of user interface procedures forming a portion of the method shown in FIG. 3.

FIG. 8 illustrates the user interface procedures 134. Again, the idle mode 104 is again illustrated in the Figure. The user interface procedures includes user actuation for receiving an award or information related to an award received from the award server, as indicated by the block 192. Also, user actuation, as indicated by the block 194, stops a game result from being sent to the award server. And, as indicated by the block 196, actuation of the user interface by the user activates a game result to be sent to the award server, as well as permits defining if all or only a best-play score is to be sent. Then, and as indicated by the block 198, a re-send timer is initialized. After completion of the procedures of the blocks 192, 194, and 196, together with block 198, a loop is taken back to permit the procedures to be re-effectuated.

In exemplary operation of the mobile terminal 12, the user first registers with the award server. The user gives information pursuant to user interface registration procedures which is to be sent to the award server. Registration also provides authorization for use to be made of the information provided to the award server by the user for purposes of marketing. Also, pursuant to registration, the user of the mobile terminal receives an acknowledgment message of an encryption key which is utilized for authentication and security purposes. As noted above, part of the registration procedure includes identification of the MSISDN of the mobile terminal, used for purposes of routing, and the IMEI of the mobile terminal, for purposes of providing the award server with information of a currently-used mobile terminal and type. That is to say, indications of the IMEI at the mobile terminal is required so that the award server is able to grant awards which can be used at that mobile terminal. Identification of the IMEI also provides the award server with marketing information so that advertising of new types of mobile terminals can be provided to the user of the mobile terminal.

After completion of the computer game, a message is provided on the display element concerning the game award request action to be next performed. Implementation of collecting of scores of the specific game that has been played and decisions related to whether the game score is above a selected threshold resides either within the code forming the computer game or within the controller 58.

If the mobile terminal is utilized at a place in which radio coverage is not available, games can still be played at the mobile terminal. Award requests are saved thereat and overriding of best-scores with newer best-scores continues until the mobile terminal is placed within an area encompassed by radio coverage. Then, award requests are generated. A message to the award server is generated, ciphered and sent to the award server, as appropriate.

The award server generates feedback to be returned to the mobile terminal responsive to the award request. When the acknowledgment message is received at the mobile terminal, a notice, in the exemplary implementation, of the receipt of the acknowledgment is displayed on the display element of the user interface. And, if feedback is not generated within a selected time period, the award request is re-sent. A default timer value may be used, or otherwise stored at the mobile terminal responsive to initial registration of the mobile terminal. In one implementation, the award request functionality is suspended, when desired by the user.

Also during operation of an embodiment of the present invention, a data base is maintained at the award server. Operation of the award server, independent of the transmission method by which award requests are provided to the award server. For instance, the award server is functionally equivalent irrespective of whether the embodiments shown in FIG. 1 or FIG. 2 are utilized. At the data base, information is maintained regarding registered users, with respect, for instance, to the MSISDN, IMEI, encryption keys, allocated awards, authorizations provided by the user, etc. Also, if a single award server is utilized for both USSD and SMS-connected users, information of the transfer interface which is utilized is also stored at the data base, if not otherwise known from routing and addressing parameters at the server.

When feedback related to an award grant is returned to the mobile terminal, a new award-winning score limit may be sent for the award-granted game which is higher than the previous success indicia value. The server keeps track of the game award levels for each user. In one implementation, the award server is further operable to obtain detailed statistical information related from the usage of each user. If so, the type of mobile terminal utilized for the playing of the game, etc., is maintained, grouped according, for instance, by age and sex of the user, as well as the terminal type which is utilized to play the game. Statistics of the awards are further collected and a user of the year can be chosen according to such statistics. Extra awards, etc., may be provided responsive thereto. The server is also able to activate or have other network elements and direct advertising of new products and services to the user registered in the system.

Thereby, a manner is provided by which to award a user who plays a computer game which is incorporated into the functionality of the mobile terminal. Not only are rewards provided to the user, but marketing information is also provided related to the user and the use of the mobile terminal.

The previous descriptions are of preferred examples for implementing the invention, and the scope of the invention should not necessarily be limited by this description. The scope of the present invention is defined by the following claims:

I claim:

1. Apparatus for a mobile terminal selectably also operable by a user in a radio communication system to effectuate telephonic communication with a communication station by way of a communication path that includes a radio part, said apparatus comprising:

at least one executable block of code forming a recreational application, executable by the user at the mobile terminal pursuant to user interaction therewith, execution of the recreational application forming said executable block of code generating at least an indicia of performance success of the execution by the user of the recreational application forming said executable block of code;

a detector coupled to receive indications of the indicia of performance success generated during execution of the recreational application forming said executable block of code, said detector at least for detecting whether the indicia of performance is beyond a selected threshold and for selectively generating a result indication indicative thereof;

a formatter coupled to receive the result indication generated by said detector, said formatter for formatting the result indication into a signal transmittable upon the communication path, and a response-message receiver coupled to receive a response-message communicated to the mobile terminal, the response-message comprising a reward.

2. The apparatus of claim 1 further comprising a user interface having a user actuator actuable by the user, selected actuation of the user actuator for initiating execution of the recreational application forming said executable block of code and for permitting the user interaction responsive to which the performance success is.

3. The apparatus of claim 2 wherein said at least one executable block of code comprises a first recreational application formed of a first executable block of code and at least a second recreational application formed of at least a second executable block of code and wherein the selected actuation of the user interface by the user is further for selecting which of the first and at least second recreational application is formed of the first and at least second executable blocks of code, respectively, of which execution is initiated.

4. The apparatus of claim 2 wherein further selected actuation of user actuator is permitted during execution of said executable block forming the recreational application and wherein the performance success of the execution of said block of code is determined, at least in part, responsive to selected user actuation of the user actuator.

5. The apparatus of claim 1 wherein a game score is tallied during execution of the recreational application, the game score forming the indicia of performance success.

6. The apparatus of claim 5 wherein said detector detects whether the game score is greater than the selected threshold, the game score determined to be a winning score responsive to detection by said detector of the game score relative to the selected threshold.

7. The apparatus of claim 6 wherein said formatter formats the result indication to form an SMS (short message service) message.

8. The apparatus of claim 7 wherein the communication path includes a reverse link and a forward link, wherein the SMS message formed by said formatter is communicated upon the reverse link and wherein the response-message is communicated upon the forward link responsive to the SMS message.

9. The apparatus of claim 1 wherein the selected threshold is related to a prior level of success indicia of prior execution of the executable block of code at the mobile terminal.

10. The apparatus of claim 1 wherein the reward comprises additional executable code, the additional executable code additionally executable by the user.

11. A method for forming a recreationally-related result indication at a mobile terminal selectably also operable by a user in a radio communication system to effectuate telephonic communication with a communication station by way of a communication path that includes a radio part, said method comprising:

executing an executable block of code at the mobile terminal, the executable block of code forming a recreational application, executable by the user, pursuant to user interaction with the mobile terminal;

generating at least an indicia of performance success of execution, during said operation of executing, of the recreational application formed of the executable block of code;

detecting whether the indicia of performance is beyond a selected threshold;

forming a result indication representative of detection made during said operation of detecting;

formatting the result indication into a signal transmittable upon the communication path;

sending the signal formatted during said operation of formatting to the communication station; and receiving a response-message from the communication station responsive to receipt at the communication station of the signal sent during said operation of sending, the response-message comprising a reward.

12. The method of claim 11 wherein the reward comprises additional executable code, the additional executable code additionally executable by the user.

13. The method of claim 11 comprising the additional operation of returning a response-message to the mobile terminal responsive to receipt at the communication station of the signal sent during said operation of sending.

14. The method of claim 11 comprising the additional operation of using the response-message at the mobile terminal subsequent to reception thereat.

15. Reward-granting apparatus for an award server operable in a communication system having a radio part, the award server adapted to communicate with a mobile terminal in a communication system by way of a communication path that extends through the radio part, said apparatus comprising:

a result-indication signal receiver coupled to receive indications of a result-indication signal communicated to the award server by the mobile terminal, the result-indication signal generated responsive to success of execution at the mobile terminal of a recreational application, success gauged by an indicia of performance success associated with the execution of the recreational application beyond a selected threshold;

an award database having result data indexed together with a mobile terminal user identity, said award database accessible at least responsive to receipt at said result-indication signal receiver of the result-indication signal; and a reward signal generator selectably operable responsive to data accessed from said award database, said reward signal generator for generating a reward signal for communication to the mobile terminal, the reward signal representative of a reward responsive at least alternately to one of the result-indication signal and values stored in said award database.

16. The apparatus of claim 15 wherein the result-indication signal comprises an SMS (short message service) message and wherein said result-indication signal receiver comprises an SMS message receiver.

17. The apparatus of claim 15 wherein said database maintains a cumulative count representative of cumulative values of the result-indication signal generated by the mobile terminal.

18. The apparatus of claim 15 wherein the reward signal generated by said reward signal generator is generated responsive to a combination of both the result-indication signal and the values stored in the award database.

19. The apparatus of claim 18 wherein the reward signal is of values which defines executable code, the executable code executable at the mobile terminal.

* * * * *

UNITED STATES PATENT AND TRADEMARK OFFICE
CERTIFICATE OF CORRECTION

PATENT NO. : 7,088,692 B1
APPLICATION NO. : 09/376927
DATED : August 8, 2006
INVENTOR(S) : Grönroos It is certified that error appears in the above-identified patent and that said Letters Patent is hereby corrected as shown below:

Title Page, Item (54) and Column 1, line 1
Lines 1 – 4, the title should read
--RECREATIONAL REWARD-RELATED APPARATUS, AND ASSOCIATED METHOD, FOR REWARDING PERFORMANCE OF EXECUTION OF A RECREATION APPLICATION AT A MOBILE TERMINAL --.

Column 11,
Line 38, after "A method for forming", cancel "a".

Signed and Sealed this

Sixth Day of February, 2007

JON W. DUDAS
*Director of the United States Patent and Trademark Office*